United States Patent
Thakur et al.

(10) Patent No.: US 10,303,667 B2
(45) Date of Patent: May 28, 2019

(54) INFINITE VERSIONING BY AUTOMATIC COALESCING

(71) Applicant: Rubrik, Inc., Palo Alto, CA (US)

(72) Inventors: Tarun Thakur, Fremont, CA (US); Pin Zhou, San Jose, CA (US); Prasenjit Sarkar, Los Gatos, CA (US)

(73) Assignee: Rubrik, Inc., Palo Alto, CA (US)

( * ) Notice: Subject to any disclaimer, the term of this patent is extended or adjusted under 35 U.S.C. 154(b) by 425 days.

(21) Appl. No.: 15/006,256

(22) Filed: Jan. 26, 2016

(65) Prior Publication Data

US 2016/0217163 A1 Jul. 28, 2016

Related U.S. Application Data

(60) Provisional application No. 62/107,609, filed on Jan. 26, 2015.

(51) Int. Cl.
*G06F 17/30* (2006.01)
*G06F 16/21* (2019.01)

(52) U.S. Cl.
CPC .................................. *G06F 16/219* (2019.01)

(58) Field of Classification Search
CPC ..................... G06F 17/30309; G06F 17/30312
See application file for complete search history.

(56) References Cited

U.S. PATENT DOCUMENTS

| | | | |
|---|---|---|---|
| 2005/0131990 A1* | 6/2005 | Jewell | G06F 11/1464 709/201 |
| 2011/0153650 A1* | 6/2011 | Lee | G06F 16/10 707/769 |
| 2015/0120656 A1* | 4/2015 | Ramnarayanan | G06F 17/30129 707/616 |

* cited by examiner

*Primary Examiner* — Loc Tran
(74) *Attorney, Agent, or Firm* — Schwegman Lundberg & Woessner, P.A.

(57) ABSTRACT

Embodiments disclosed herein provide systems, methods, and computer readable media for infinite versioning by automatic coalescing. In a particular embodiment, a method provides determining an age range for a plurality of data versions stored in a secondary data repository and identifying first data versions of the plurality of data versions that are within the age range. The method further provides determining a compaction ratio for the first data versions and compacting the first data versions based on the compaction ratio.

17 Claims, 6 Drawing Sheets

INFINITE VERSIONING BY AUTOMATIC COALESCING

RELATED APPLICATIONS

This application is related to and claims priority to U.S. Provisional Patent Application 62/107,609, titled "INFINITE VERSIONING BY AUTOMATIC COALESCING," filed Jan. 26, 2015, and which is hereby incorporated by reference in its entirety.

TECHNICAL BACKGROUND

A data protection system can store multiple versions of data as the data changes over time. That is, instead of only maintaining a backup of the most recent state of the data, the data protection system maintains states of the data at intervals over time. Accordingly, a system has the option to restore or otherwise access the data as it was at points in time beyond the most recent time. Ideally, an unlimited amount of storage would be required to store an unlimited number of versions back until the data was originally created. However, unlimited storage is usually not feasible and the number of versions stored therefore needs to be limited to fit within the finite amount of storage available.

OVERVIEW

Embodiments disclosed herein provide systems, methods, and computer readable media for infinite versioning by automatic coalescing. In a particular embodiment, a method provides determining an age range for a plurality of data versions stored in a secondary data repository and identifying first data versions of the plurality of data versions that are within the age range. The method further provides determining a compaction ratio for the first data versions and compacting the first data versions based on the compaction ratio.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The various embodiments disclosed herein provide means for coalescing versions of data that were stored over time during data protection or otherwise. By coalescing, or compacting, multiple versions into fewer versions, it can be ensured that, when available storage is finite, versions of the data continue to be stored back in time until an original store point of the data. In particular, the oldest versions of the data are compacted into fewer versions thereby retroactively reducing the frequency in which versions of the data are protected. This allows for more of the finite storage space to be used for more frequent newer versions of the data, including the creation of new versions as the data continues to be protected.

Figure 1:
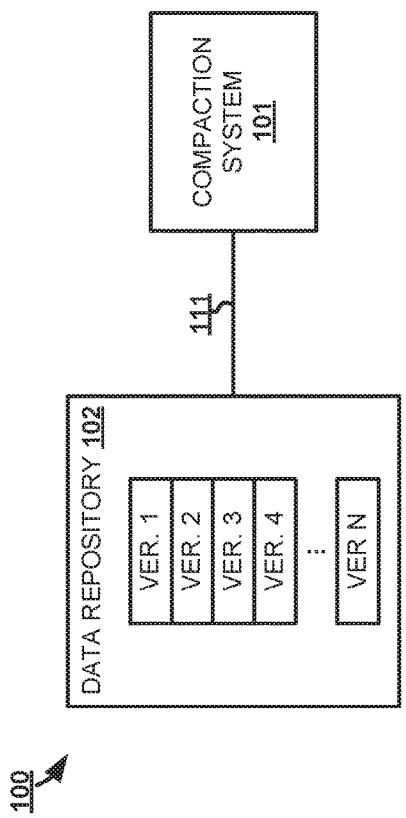
FIG. 1 illustrates a computing environment for infinitely versioning data by automatic coalescing.

FIG. 1 illustrates computing environment 100 in an example scenario of infinitely versioning data by automatic coalescing. Computing environment 100 includes data compaction system 101 and data repository 102. Data repository 102 includes data versions 1-N. Data compaction system 101 and data repository 102 communicate over communication link 111. Data versions 1-N may represent versions of the entirety of the data being protected or may be merely a subset of the data, such as one or more data tables, files, etc.

In operation, each data version represents the current state of data at the time the version was created. As noted above, the versions may be the result of a data protection process that backs up the data for restoration or other access at a later time. Each version may include the entirety of the data at the time of version creation but, more likely, a version only includes differences between it and a preceding version or a preceding base copy of the data item, which uses less storage space. The versions may be created at set times, once a time period, every time the data changes, or on any other type of schedule. As more data versions are stored in repository 102, the space available for storing new versions decreases. Therefore, data compaction system 101 compacts older data versions into fewer data versions to make more space available for the creation of newer versions. As such, older versions of the data continue to exist, although, after compaction, the versions are less frequent than originally stored.

Figure 2:
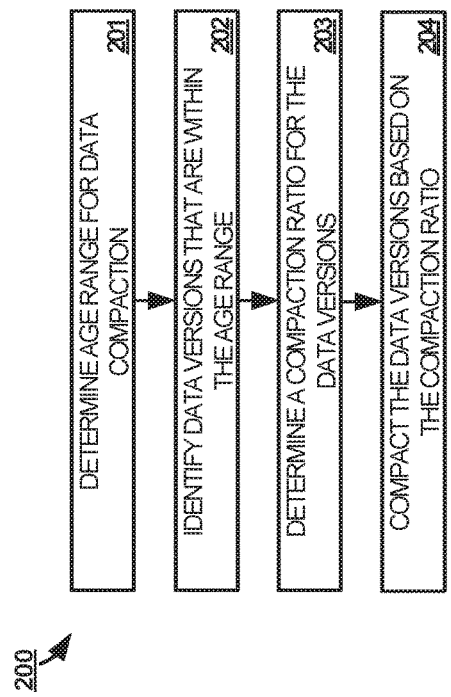
FIG. 2 illustrates an operation of the computing environment for infinitely versioning data by automatic coalescing.

FIG. 2 illustrates operation 200 of computing environment 100 for infinitely versioning data by automatic coalescing. Operation 200 provides determining an age range for data versions 1-N stored in data repository 102 (step 201). The age range may be set by a user, may be preset in data compaction system 101, may be dynamic depending on the capacity of data repository 102 relative to the number of versions stored, or may be defined in some other way. The age range may be defined relative to the time of version creation (e.g. data versions older than one month) or relative to other versions (e.g. 100 oldest data versions).

Using the determined age range, operation 200 provides identifying first data versions of data versions 1-N that are within the age range (step 202). Each data version is associated with a time stamp and/or an indicator of sequence relative to other versions. This information may be stored in metadata for each data version, which may be stored on data repository 102 or elsewhere. The information is used to determine whether a particular data version falls within the age range.

Operation 200 further provides determining a compaction ratio for the first data versions (step 203). The compaction ratio indicates a number of data versions that should be compacted into a single data version. For example, a compaction ratio of 10 indicates that 10 sequential data versions should be compacted into one data version. As with the age range, the compaction ratio may be set by a user, may be preset in data compaction system 101, may be dynamic depending on the capacity of data repository 102 relative to the number of versions stored, or may be defined in some other way.

Operation 200 provides compacting the first data versions based on the compaction ratio (step 204). For example, if 100 pre-compaction data versions fall within the age range and the compaction ratio is 10, then those 100 pre-compaction data versions will be compacted into 10 resulting data versions with each of those 10 resulting data versions being generated from 10 sequential versions of the 100 pre-compaction data versions. Each resulting version reflects the state of the data at the time of most recent pre-compaction version from which it was created. However, while that most recent pre-compaction version relied on nine preceding data versions, the resulting version includes the changes to the data represented by the most recent pre-compaction version and those nine preceding data versions. Advantageously, the resulting versions take up less storage space than the pre-compaction versions from which they were created.

Referring back to FIG. 1, data compaction system 101 comprises a computer system and communication interface. Data compaction system 101 may also include other components such as a router, server, data storage system, and power supply. Data compaction system 101 may reside in a single device or may be distributed across multiple devices. Data compaction system 101 could be an application server(s), a personal workstation, or some other network capable computing system—including combinations thereof.

Data repository 102 comprises one or more data storage systems having one or more non-transitory storage medium, such as a disk drive, flash drive, magnetic tape, data storage circuitry, or some other memory apparatus. The data storage systems may also include other components such as processing circuitry, a router, server, data storage system, and power supply. The data storage systems may reside in a single device or may be distributed across multiple devices. While shown separately, all or portions of data repository 102 could be integrated with the components of data compaction system 101.

Communication link 111 could be internal system busses or use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication link 111 could be direct links or may include intermediate networks, systems, or devices.

Figure 3:
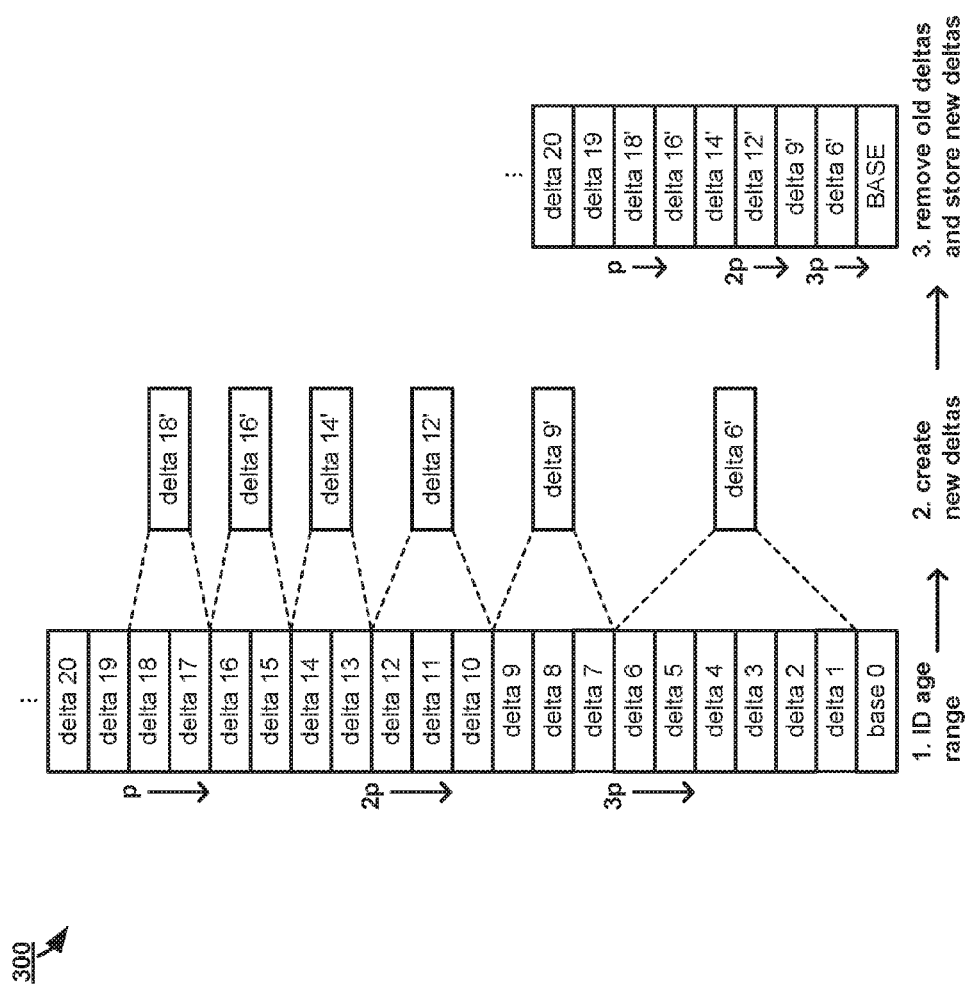
FIG. 3 illustrates an operational scenario of the computing environment for infinitely versioning data by automatic coalescing.

FIG. 3 illustrates operation 300 in an example scenario of infinitely versioning data by automatic coalescing. Operation 300 shows a base 0 that stores a copy of data in its entirety on data repository 102. Deltas 1-20, and so on, represent backups to the data (i.e. versions) that track changes to the data at each backup point. That is, delta 1 represents changes to the data since base 0 was stored, delta 2 represents changes to the data since delta 1 was stored, delta 3 represents changes to the data since delta 2 was stored, and so on. Thus, for example, if the time for delta 3 were used as a restore point, the changes represented by delta 1, and delta 2, and delta 3 would need to be sequentially applied in that order, or be selectively applied at the same time to base 0 in order to restore the data to the time delta 3 was stored.

In operation 300, there are multiple age ranges (p, 2p, and 3p) and each age range has its own compaction ratio. Deltas in older age ranges have higher compaction ratios. At step 1, deltas within each age range are identified. Deltas 1-6 are all older than 3p, deltas 7-12 are all older than 2p but newer than 3p, and deltas 13-18 are all older than p but newer than 2p. Once the deltas in each range have been identified, step 2 creates new deltas by compacting the deltas in each range based on each range's respective compaction ratio.

In this example, the compaction ratio for 3p is 6, the compaction ratio for 2p is 3, and the compaction ratio for p is 2. Thus, all six deltas in the 3p range are compacted into a single delta 6', the six deltas between 3p and 2p are compacted into two deltas 9' and 12', and the six deltas between 2p and p are compacted into three deltas 14', 16', and 18'. Using delta 6' as an example, delta 6' is now a restore point representing the same data state as delta 6 used to. However, in order to do so, delta 6' also includes all changes defined by deltas 1-5 in that order. For example, if a change in delta 1 is over written by a change in delta 3, then the change in delta 3 remains in delta 6'. The fact that the change in delta 1 is not saved in delta 6' is also one reason why delta 6' uses less storage space than the combination of deltas 1-6. Accordingly, the data restore point provided by delta 6, call it data restore point 6 for ease of reference, is the same for delta 6'.

To compact deltas 1-6 into delta 6', compaction system 101 builds an interval tree for restore point 6 based on base 0 and deltas 1-6. The output of the interval tree will be a list of logical block address (LBA) ranges for restore point 6. Each LBA range is mapped to a physical location of the data in data repository 102 (which delta/base file, and the offset inside the delta/base file). The new delta file delta 6' is formed by all the LBA ranges which refer to the deltas 1-6. More specifically, compaction system 101 obtains the data mapping from the LBA ranges and concatenates all the required data pieces from deltas 1-6 together based on the order of the LBA ranges.

After the new deltas have been generated, step 3 removes deltas 1-19 from storage repository 102 and stores deltas 6', 9', 12', 14', 16', and 18' in their place. Continuing the example from above compaction system 101 saves the new delta file delta 6' in data repository 102 and adds a delta map entry for each LBA range which maps to a portion in delta 6'. Then remove all the delta map entries referring to deltas 1-6 from a metadata store, which may be located in data repository 102 or elsewhere, then remove the old deltas 1-6 from data repository 102.

After step 3, the possible restore points older than p have been reduced from 18 to 6. Moreover, since the compaction ratio gets progressively larger, the restore points are spaced further apart as the deltas get older. Thus, while the restore points are spaced further apart after compaction, restore points still exist rather than being deleted all together.

It should be understood that while the compaction ratios in operation 300 increase linearly with the age of the deltas, the compaction ratios may be defined in other ways. For example, the compaction ratios may increase exponentially. In a particular case, for the deltas between [2p, p), the compaction ratio is r. For the deltas between [np, (n−1)p), the compaction ratio may be defined as r*f(n−2) where f is the adjustment factor based on age. For instance, if r=10 and f=3, for deltas with age [3p, 2p), every 10*3=30 the deltas will be compacted into a single delta. It should also be understood that the operations described above may repeat themselves over time to continually, at scheduled intervals, upon storage level thresholds being satisfied, or otherwise, to compact the deltas and ensure room will always be available for the storing of new deltas.

Figure 4:
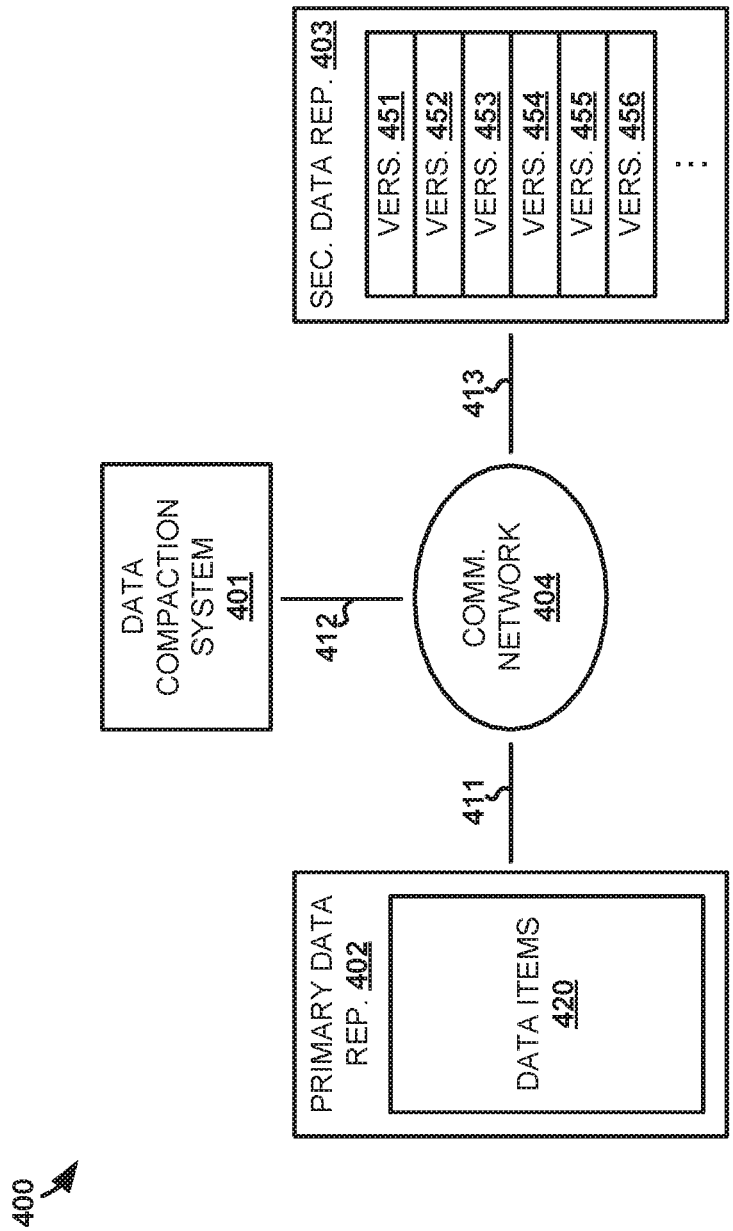
FIG. 4 illustrates another computing environment for infinitely versioning data by automatic coalescing.

FIG. 4 illustrates computing environment 400 for infinitely versioning data by automatic coalescing. Computing environment 400 includes data compaction system 401, primary data repository 402, secondary data repository 403, and communication network 404. Data compaction system 401 and communication network 404 communicate over communication link 411. Primary data repository 402 and communication network 404 communicate over communication link 412. Secondary data repository 403 and communication network 404 communicate over communication link 413.

In operation, primary data repository 402 includes data items data items 420 and, in some cases, may be distributed across multiple storage systems despite being represented as a single element in computing environment 400. Primary data repository 402 may be accessed by any system so configured and authorized for such access. For instance, data items 420 may be included in a database that is accessed by various user systems over communication network 404. As such, those user systems may view, change, delete, and/or otherwise manipulate data items 420.

Since data items 420 may be constantly changing, secondary data repository 403 is configured to store incremental data versions of any changes made to data items 420. As is the case with primary data repository 402, secondary data repository 403 may be distributed across multiple storage systems rather than a single element, as shown in computing environment 400. Each data version stored in secondary data repository 403 includes a record of all changes made to data items 420 since a previous data version was created. In particular, secondary data repository 403 stores data versions 451-456 with data version 451 being the most recent data version following data version 452, with data version 456 being the oldest version shown in secondary data repository 403. Though not shown, secondary data repository 403 may include additional data versions older than data version 456 and include a base version from which the changes depend. Should a system, at the instruction of a user or otherwise, need to access data items 420 as they existed in a past state, a version corresponding to that past state may be retrieved from secondary data repository 403.

Eventually, as data versions continue to be created and stored in secondary data repository 403, secondary data repository 403 will run out of storage space and adding additional storage to secondary data repository 403 may not be feasible or otherwise desired. As such, data compaction system 401 is configured to compact older data versions into fewer data versions that should result in the freeing up of storage space in secondary data repository 403. While the granularity of the data versions is effected by creating one version from many during the compaction, this disclosure assumes that fewer increments are acceptable for older data versions. Of course, a user may adjust the granularity of data versions in certain age ranges to suit their needs.

Figure 5:
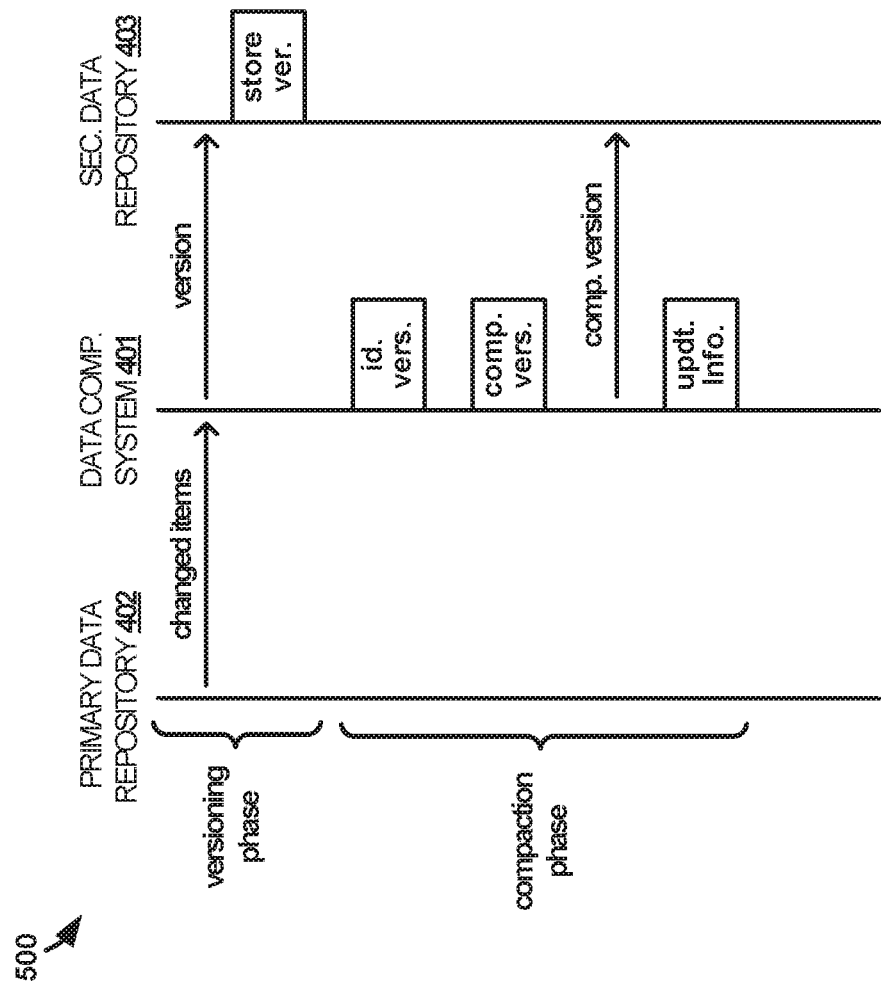
FIG. 5 illustrates an operation of the other computing environment for infinitely versioning data by automatic coalescing.

FIG. 5 illustrates operation 500 of computing environment 400 for infinitely versioning data by automatic coalescing. In this example, data compaction system 401 is also the system that creates versions of data items 420, although in other embodiments, a separate system(s) may be used to create versions. During the versioning phase, data compaction system 401 receives changed data items of data items 420 from primary data repository 402. As noted above, the changed data items are data items that have changed since the previous data version was created. The changed data items are compiled into a new data version and stored in secondary data repository 403. For example, data version 451 is generated to include the data items that have changed since data version 452 was created. Data compaction system 401 will repeat the versioning phase whenever parameters indicate a new version should be created. The parameters may indicate a time of day when new versions should be created, a time period between the creation of versions, a trigger based on data changes, or any other manner in which data version creation may be scheduled.

Additionally, data compaction system 401 performs a compaction phase. The compaction phase may occur after each execution of the versioning phase or may occur on some other schedule. For example, the compaction phase may be scheduled to execute once a day or week or may be scheduled to execute whenever secondary data repository 403 reaches a certain level of free storage space remaining. Regardless of when the compaction phase is scheduled to execute, during the compaction phase, data compaction system 401 identifies versions of the data versions stored in secondary data repository 403 that meet criteria for compaction. The criteria for compaction may include age ranges, age thresholds, size thresholds, compaction ratios, or some other manner in which data versions can be grouped. The criteria for compaction may indicate more than one group of versions for compaction. For instance, a group of newer data versions may include fewer data versions than an older group of data versions which likely requires less granularity. It should also be understood, that any group of data versions for compaction includes sequential data versions.

Once the data versions have been identified, each group of identified data versions are compacted into a single data version that increments from the immediately preceding data version, which itself may also be a compacted data version. The compacted data versions are stored in secondary data repository 403. Data compaction system 401 then updates information, such as an index, that indicates which data versions are available from secondary data repository 403 to reflect that the data versions in each group now each comprise a single data version. Thus, any system attempting to access data versions in secondary data repository 403 would be informed that only the compacted versions are now available.

Figure 6:
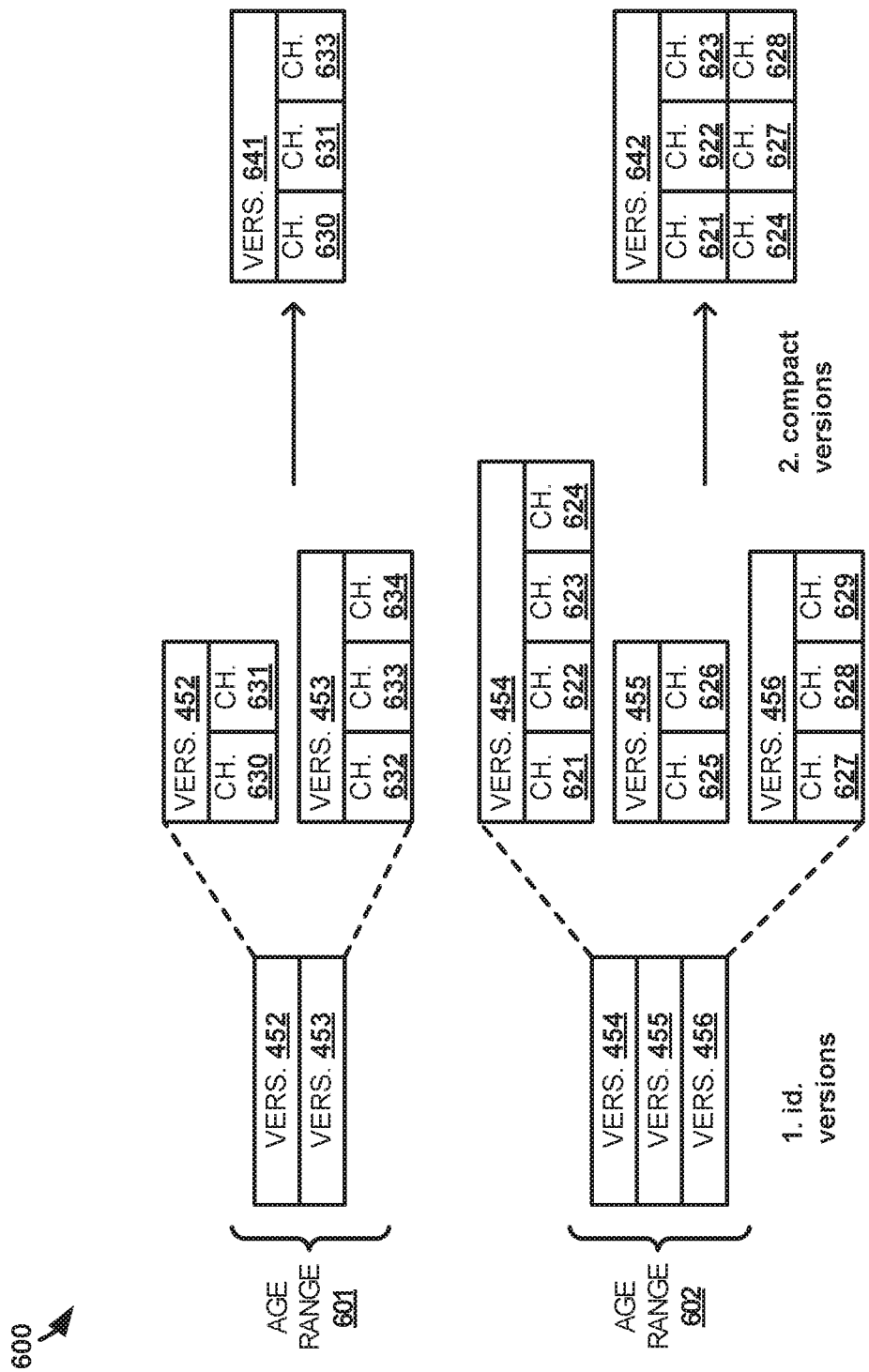
FIG. 6 illustrates an operational scenario of the other computing environment for infinitely versioning data by automatic coalescing.

FIG. 6 illustrates operational scenario 600 of the other computing environment for infinitely versioning data by automatic coalescing. In particular, operational scenario 600 represents an example of the compaction phase of operation 500 as it might be applied to data versions 451-456 of secondary data repository 403. At step 1 of operational scenario 600, data versions are identified and grouped in accordance with criteria for compaction. In this example, age range 601 as defined by the criteria for compaction groups data version 452 and data version 453. Likewise, age range 602 as defined by the criteria for compaction groups data version 454, data version 455, and data version 456. Data version 451 does not satisfy any criteria for compaction (e.g. data version 451 may be too new to require compaction) and is therefore not identified at step 1.

Operational scenario 600 further illustrates the contents of each data version. Specifically, each of data versions 451-456 include data items changes 621-634, as illustrated. At step 2, data version 452 and data version 453 are compacted into data version 641 and data version 454, data version 455, and data version 456 are compacted into data version 642. In this example, data version 641 includes only those changes that differentiate data version 452 from data version 454, essentially skipping data version 455 and data version 456 while still accounting for its changes. Likewise, data version 642 includes only those changes that differentiate data version 454 from whatever data version immediately preceded data version 456, essentially skipping data version 455 and data version 456 while still accounting for their changes. Accordingly, data version 641 includes changes 630, 631, and 633, as changes 632 and 634 are either no longer needed or have been incorporated into changes 630, 631, and 633. Likewise, data version 642 includes changes 621-624 and 627-628, as changes 625-626 and 629 are either no longer needed or have been incorporated into changes 625-626 and 629.

Advantageously, replacing data version 452 and data version 453 with data version 641 and replacing data version 454, data version 455, and data version 456 with data version 642 reduces the number of changes that need to be stored in secondary data repository 403. Space is therefore freed up in secondary data repository 403 and that additional room can be used to store new versions of data items 420.

Figure 7:
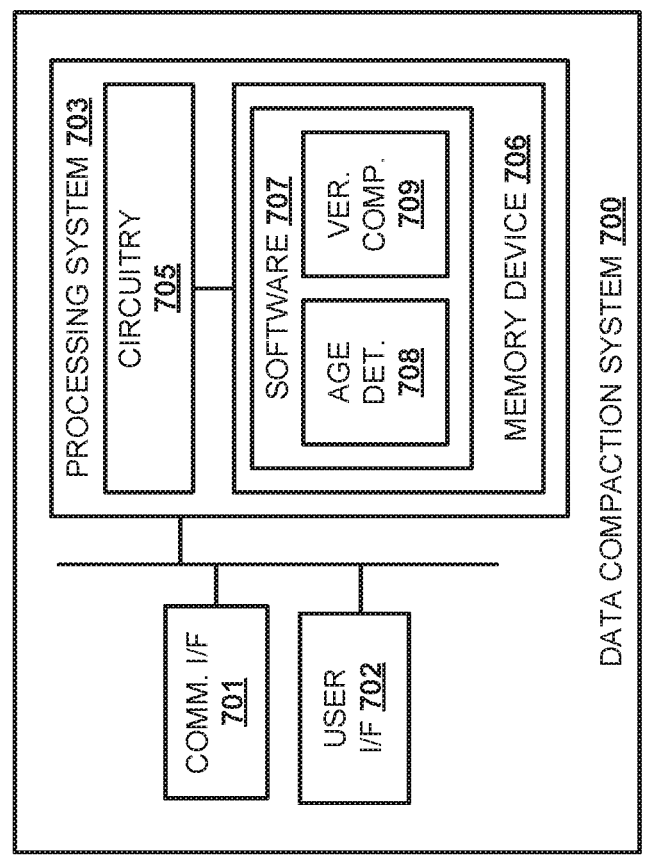
FIG. 7 illustrates a data processing system for infinitely versioning data by automatic coalescing.

FIG. 7 illustrates data compaction system 700. Data compaction system 700 is an example of data compaction system 101, although system 101 may use alternative configurations. Data compaction system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes age determination module 708 and version compaction module 709. Operating software 707 may further include an operating system, utilities, drivers, network interfaces, applications, or some other type of software. When executed by circuitry 705, operating software 707 directs processing system 703 to operate Data compaction system 700 as described herein.

In particular, age determination module 708 directs processing system 703 to determine an age range for a plurality of data versions stored in a secondary data repository and identify first data versions of the plurality of data versions that are within the age range. Version compaction module 709 directs processing system 703 to determine a compaction ratio for the first data versions and compact the first data versions based on the compaction ratio.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of infinitely versioning data by automatic coalescing, the method comprising: determining one or more age ranges for a plurality of data versions stored in a secondary data repository, wherein the one or more age ranges are determined based on a capacity of the secondary data repository relative to the plurality of data versions stored in the secondary data repository, each data version storing a set of changes made to a set of data items since a previous data version; for a first age range of the one or more age ranges:
    determining first data versions of the plurality of data versions that are within the first age range;
    determining a first compaction ratio defining a number of data versions to be compacted into one single data version based on the first age range;
    compacting the first data versions to one or more first compacted data versions, each first compacted data version including non-overwritten changes included in the number of data versions of the first data versions;
    storing the one or more first compacted data versions; and
    removing the first data versions.

2. The method of claim 1, wherein compacting the first data versions to one or more first compacted data versions comprises generating a list of logical block address ranges for the one or more first compacted data versions, each logical block address mapping to a physical location in the secondary data repository.

3. The method of claim 1, wherein compacting the first data versions based on the first compaction ratio comprises:
    grouping the first data versions into one or more sequential data version groups each including the number of data versions of the first data versions; and
    for each sequential data version group: removing overwritten changes of the number of data versions.

4. The method of claim 1, further comprising determining a second compaction ratio for a second age range of the one or more age ranges, wherein the second age range is older than the first age range and the second compaction ratio is greater than the first compaction ratio.

5. The method of claim 1, wherein the data items are stored in a primary data repository separate from the secondary data repository.

6. The method of claim 1, further comprising determining second data versions that are within a second age range, wherein the second age range is older than the first age range and the second data versions are more than the first data versions.

7. A non-transitory computer readable storage medium having instructions stored thereon for infinitely versioning data by automatic coalescing, the instructions, when executed by a data compaction system, direct the data compaction system to: determine one or more age ranges for a plurality of data versions stored in a secondary data repository, wherein the one or more age ranges are determined based on a capacity of the secondary data repository relative to the plurality of data versions stored in the secondary data repository, each data version storing a set of changes made to a set of data items since a previous data version; for a first age range of the one or more age ranges: determine first data versions of the plurality of data versions that are within the first age range; determine a first compaction ratio defining a number of data versions to be compacted into one single data version based on the first age range; compact the first data versions to one or more first compacted data versions, each first compacted data version including non-overwritten changes included in the number of data versions of the first data versions; store the one or more first compacted data versions; and remove the first data versions.

8. The non-transitory computer readable storage medium of claim 7, wherein the instructions configured to direct the data compaction system to compact the first data versions to one or more first compacted data versions comprise instructions configured to cause the data compaction system to generate a list of logical block address ranges for the one or more first compacted data versions, each logical block address mapping to a physical location in the secondary data repository.

9. The non-transitory computer readable storage medium of claim 7, wherein the instructions that direct the data compaction system to compact the first data versions based on the first compaction ratio comprise instructions that direct the data compaction system to:
group the first data versions into one or more sequential data version groups each including the number of data versions of the first data versions; and
for each sequential data version group: remove overwritten changes of the number of data versions.

10. The non-transitory computer readable storage medium of claim 7, wherein the instructions are further configured to direct the data compaction system to determine a second compaction ratio for a second age range of the one or more age ranges, and wherein the second age range is older than the first age range and the second compaction ratio is greater than the first compaction ratio.

11. The non-transitory computer readable storage medium of claim 7, wherein the data items are stored in a primary data repository separate from the secondary data repository.

12. The non-transitory computer readable storage medium of claim 7, wherein the instructions are further configured to direct the data compaction system to determine second data versions that are within a second age range, and wherein the second age range is older than the first age range and the second data versions are more than the first data versions.

13. A data compaction system for infinitely versioning data by automatic coalescing, the data compaction system comprising: a computer processor; and one or more non-transitory computer readable storage media storing program instructions to be executed by the computer processor and configured to cause the computer processor to: determine one or more age ranges for a plurality of data versions stored in a secondary data repository, wherein the one or more age ranges are determined based on a capacity of the secondary data repository relative to the plurality of data versions stored in the secondary data repository, each data version storing a set of changes made to a set of data items since a previous data version; for a first age range of the one or more age ranges: determine first data versions of the plurality of data versions that are within the first age range; determine a first compaction ratio defining a number of data versions to be compacted into one single data version based on the first age range; compact the first data versions to one or more first compacted data versions, each first compacted data version including non-overwritten changes included in the number of data versions of the first data versions; store the one or more first compacted data versions; and remove the first data versions.

14. The data compaction system of claim 13, wherein the program instructions configured to cause the processor to compact the first data versions to one or more first compacted data versions comprise program instructions configured to cause the processor to generate a list of logical block address ranges for the one or more first compacted data versions, each logical block address mapping to a physical location in the secondary data repository.

15. The data compaction system of claim 13, wherein the program instructions configured to cause the processor to compact the first data versions based on the compaction ratio include program instructions configured to cause the processor to:
group the first data versions into one or more sequential data version groups each including the number of data versions of the first data versions; and
for each sequential data version group: remove overwritten changes of the number of data versions.

16. The data compaction system of claim 13, wherein the program instructions are further configured to cause the processor to determine a second compaction ratio for a second age range of the one or more age ranges, and wherein the second age range is older than the first age range and the second compaction ratio is greater than the first compaction ratio.

17. The data compaction system of claim 13, wherein the program instructions are further configured to cause the processor to determine second data versions that are within a second age range, and wherein the second age range is older than the first age range and the second data versions are more than the first data versions.

* * * * *

UNITED STATES PATENT AND TRADEMARK OFFICE
CERTIFICATE OF CORRECTION

PATENT NO. : 10,303,667 B2
APPLICATION NO. : 15/006256
DATED : May 28, 2019
INVENTOR(S) : Thakur et al.

Page 1 of 2

It is certified that error appears in the above-identified patent and that said Letters Patent is hereby corrected as shown below:

In the Specification

In Column 5, Lines 21-22, delete "data items data items" and insert --data items-- therefor In the Claims In Column 8, Line 18, in Claim 1, after "comprising:", insert --¶--

In Column 8, Line 25, in Claim 1, after "version;", insert --¶--

In Column 9, Line 1, in Claim 7, after "to:", insert --¶--

In Column 9, Line 8, in Claim 7, after "version;", insert --¶--

In Column 9, Line 8, in Claim 7, after "ranges:", insert --¶--

In Column 9, Line 10, in Claim 7, after "range;", insert --¶--

In Column 9, Line 13, in Claim 7, after "range;", insert --¶--

In Column 9, Line 16, in Claim 7, after "versions;", insert --¶--

In Column 9, Line 17, in Claim 7, after "and", insert --¶--

In Column 10, Line 1, in Claim 13, after "comprising:", insert --¶--

In Column 10, Line 1, in Claim 13, after "and", insert --¶--

In Column 10, Line 4, in Claim 13, after "to:", insert --¶--

Signed and Sealed this
Eighth Day of December, 2020

Andrei Iancu
*Director of the United States Patent and Trademark Office*

CERTIFICATE OF CORRECTION (continued)
U.S. Pat. No. 10,303,667 B2

In Column 10, Line 11, in Claim 13, after "version;", insert --¶--

In Column 10, Line 12, in Claim 13, after "ranges:", insert --¶--

In Column 10, Line 13, in Claim 13, after "range;", insert --¶--

In Column 10, Line 16, in Claim 13, after "range;", insert --¶--

In Column 10, Line 20, in Claim 13, after "versions;", insert --¶--

In Column 10, Line 21, in Claim 13, after "and", insert --¶--